May 19, 1942.  J. FERGUSON  2,283,800
ELECTRODE ARRANGEMENT FOR GLASS FURNACES OR THE LIKE
Filed May 14, 1941
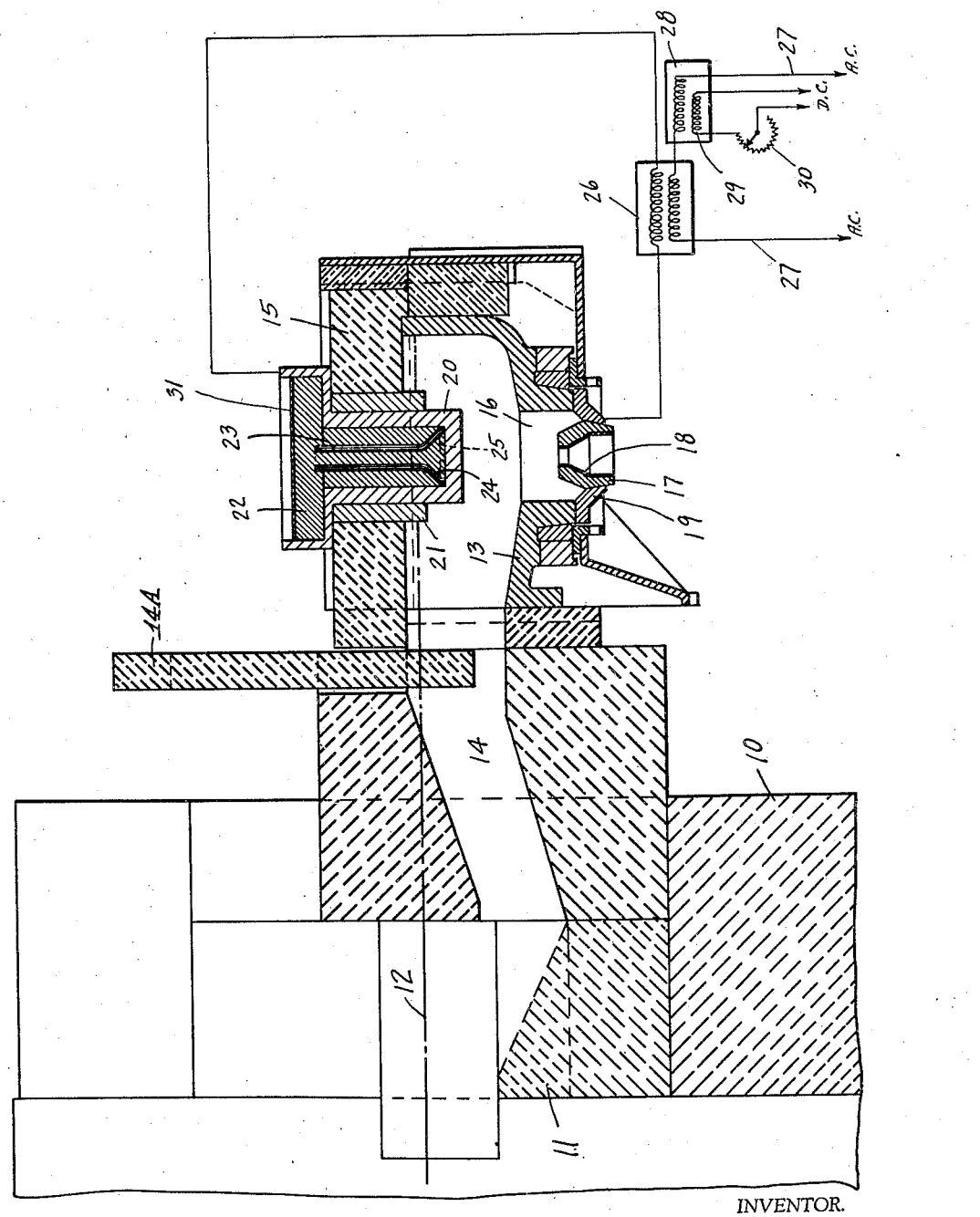
INVENTOR.
JOHN FERGUSON,
BY Lockwood, Goldsmith & Galt
ATTORNEYS.

Patented May 19, 1942

2,283,800

UNITED STATES PATENT OFFICE 2,283,800

ELECTRODE ARRANGEMENT FOR GLASS FURNACES OR THE LIKE

John Ferguson, Cleveland, Ohio

Application May 14, 1941, Serial No. 393,429

7 Claims. (Cl. 13—6)

This invention relates to an electrode arrangement for glass furnaces or the like.

In my prior Patent No. 2,186,718, issued January 9, 1940, I have disclosed a construction by means of which gob feeding of glass from a glass melting furnace is obtained without the use of mechanically moving parts or other means of applying physical forces. Although the invention described and claimed in said prior patent is applicable both to electric and fuel-fired furnaces, the construction specifically disclosed therein is primarily useful in electric furnaces. In the present application there is disclosed and claimed a construction primarily adapted to provide similar gob feed in a fuel-fired furnace. Nevertheless, certain features of the electrode arrangement disclosed herein are adapted for use in electric furnaces and are adapted for uses other than the provision of gob feed.

One object of the invention is to provide a construction by means of which the electrical control apparatus necessary for gob feed may be applied to the forehearth of a common form of fuel-fired furnace.

Another object of the invention is to provide an electrode arrangement which may be suspended from a support above the surface of molten glass and with its lower portion in contact with said glass. In accomplishing this result, the most serious problem encountered is the dissipation of sufficient heat to prevent overheating of the suspended electrode. Another object of the invention, therefore, is to provide suitable means for controlling the temperature of the electrode.

Other objects and features of the invention will be understood from the accompanying drawing and the following description and claims:

The drawing is a vertical sectional view through the forehearth of a glass furnace and a portion of the furnace proper and illustrates the application thereto of a preferred form of the invention. In the drawing, electrical connections are shown diagrammatically.

In the drawing there is shown a side wall 10 and a floor 11 of a glass furnace which may be of any well known type in which the glass batch is melted by flame or by electricity. Said furnace is normally filled with molten glass to the level indicated by the broken line 12, the batch materials being piled on the upper surface of said molten glass in the usual manner. Projecting from the side wall of the furnace there is a forehearth or feeder bowl 13 communicating with the interior of the furnace through a channel 14. Flow through channel 14 to the forehearth may be stopped by a suitable gate 14A. Said forehearth is provided with a cover 15 and a discharge well 16. In the bottom of the discharge well 16 there is provided an orifice and electrode construction which may be similar to that shown in my co-pending application Serial No. 340,433, filed June 14, 1940, now Patent #2,276,295, dated March 17, 1942. Said construction includes a refractory orifice block 17 having a metal lining 18 and surrounded by an electrode ring 19. The orifice block 17 and its metal lining are shaped to provide the necessary gob feed as described in my prior Patent No. 2,186,718.

In the cover 15 of the forehearth there is mounted an electrode construction including a metallic shell 20, the lower portion of which is immersed in the molten glass in the forehearth and the upper portion of which is of considerably greater cross sectional area and rests upon the upper surface of the cover 15. The outer surface of the shell 20 between the cover 15 and the upper surface of the molten glass is protected by a refractory casing 21 which extends downwardly into the molten glass a sufficient distance to protect the electrode surface against chemical action at the glass line and chemical action of gases above said line. The shell 20 is closed at its lower end and is adapted to contain a filling 22 of a heat transfer material in a fluid state. Within the shell 20 there is provided a central tubular member 23 of a suitable metal and said member has an outwardly flared lower portion 24 having about the circumference thereof openings 25 permitting entrance thereto of the heat transfer medium 22.

The shell 20 and the electrode ring 19 are suitably insulated and are connected to opposite terminals of the secondary winding of a transformer 26, the primary winding of which may be connected to commercial power lines 27. In one of the power lines 27 there is inserted a saturable reactor 28 having a direct current winding 29 through which a small direct current from a suitable source may be passed. The volume of said direct current is controlled by a resistor 30 and in turn controls the voltage applied to the primary winding of the transformer 26. By this means a current may be passed through the glass between the electrodes 19 and 20 and the volume of said current is controlled by adjustment of the resistor 30. The current flow thus established is used to control the temperature and consistency of the outgoing glass to produce gob feed as described in my prior Patent No. 2,186,718.

By the use of the foregoing construction I find that the electrode 20 may be formed of metal whose melting point is very close to the ordinary working temperature of the molten glass. A chrome iron alloy has been found satisfactory. Since the upper portion of the electrode shell 20 is outside of the furnace and in a zone of much lower temperature, convection currents are induced in the filling 22 of heat transfer material. The provision of the central tubular member 23 confines the upwardly moving portion of the convection currents to the interior of the electrode and the downwardly moving portions follow the side walls of the same. The heat transfer material thus serves to remove excess heat continuously from the lower part of the electrode shell 20 and to dissipate said heat in the zone of lower temperature outside the furnace. The increased cross sectional area of the shell 20 at its upper end increases the radiation and dissipation of heat. I have found that the most satisfactory heat transfer material is a metal having a melting point below the operating temperaure of the furnace and which therefore is in a molten state in normal operation. For this purpose molten tin is best adapted although molten lead has been successfully used. In some cases heat transfer materials other than metals are satisfactory—for example, melted borax. In order to prevent oxidation of the surface of the molten material exposed to the atmosphere, I may float upon the surface thereof a layer 31 of another material which also remains liquid at the operating temperature, but which does not oxidize when exposed at high temperature to the atmosphere. For this purpose I prefer borax but other material may be used.

The use of convection currents for cooling the electrode insures greater rapidity of movement and greater heat dissipation as the temperature of the lower portion of the electrode increases. A practically automatic temperature control is thus established which could not be obtained by other types of circulation. This factor is particularly important in the melting of high silica glass where the working temperature is relatively high. In such cases separately controlled water or air cooling often results in excessive cooling of the electrode and deposition of solid glass on the surface thereof. In that event arcing is apt to take place between the electrode and the molten glass with consequent destruction of the electrod and contamination of the outgoing glass. For glass which does not require such a high working temperature, air cooling may be successfully employed.

The invention has been described in one of its preferred forms, the details of which may be varied without departing from the scope of the invention as defined by the appended claims.

The invention claimed is:

1. An electrode construction for glass furnaces and the like including an electrically conductive shell closed at the bottom and open to atmosphere at the top, means for supporting said shell with the closed lower portion thereof in contact with molten material in the furnace and the open upper portion in a region of lower temperature outside of said furnace, and a filling in said shell of a metal having a melting point below the normal operating temperature of the furnace and adapted to conduct heat from the lower to the upper portion of said shell by convection currents and to dissipate said heat in the region of lower temperature.

2. An electrode construction for glass furnaces and the like including an electrically conductive shell closed at the bottom and open to atmosphere at the top, means for supporting said shell with the closed lower portion thereof in contact with molten material in the furnace and the open upper portion in a region of lower temperature outside of said furnace, and a filling of molten tin in said shell adapted to conduct heat from the lower to the upper portion of said shell by convection currents and to dissipate said heat in the region of lower temperature.

3. An electrode construction for glass furnaces and the like including an electrically conductive shell closed at the bottom and open to atmosphere at the top, means for supporting said shell with the closed lower portion thereof in contact with molten material in the furnace and the open upper portion in a region of lower temperature outside of said furnace, and a filling of molten lead in said shell adapted to conduct heat from the lower to the upper portion of said shell by convection currents and to dissipate said heat in the region of lower temperature.

4. An electrode construction for glass furnaces and the like including an electrically conductive shell closed at the bottom and open at the top, means for supporting said shell with the closed lower portion thereof in contact with molten material in the furnace and the open upper portion in a region of lower temperature, a filling in said shell of a material having a melting point below the normal operating temperature of the furnace and adapted to conduct heat from the lower to the upper portion of said shell by convection currents and to dissipate said heat in the region of lower temperature, and a central tubular member in said shell adapted to confine the upwardly moving portions of said convection currents to the central portion of said shell.

5. An electrode construction for glass furnaces and the like including an electrically conductive shell closed at the bottom and open at the top, means for supporting said shell with the closed lower portion thereof in contact with molten material in the furnace and the open upper portion in a region of lower temperature, a filling in said shell of a material having a melting point below the normal operating temperature of the furnace and adapted to conduct heat from the lower to the upper portion of said shell by convection currents and to dissipate said heat in the region of lower temperature, and a central tubular member in said shell having an outwardly flared lower end at least a part of which is open to permit entrance of molten metal thereto, said tubular member being adapted to confine the upwardly moving portions of said convection currents to the central portion of said shell.

6. An electrode construction for glass furnaces and the like including an electrically conductive shell closed at the bottom and open to atmosphere at the top, means for supporting said shell with the closed lower portion thereof in contact with molten material in the furnace and the open upper portion in a region of lower temperature outside of said furnace, and a filling in said shell of a material having a melting point below the normal operating temperature of the furnace and adapted to conduct heat from the lower to the upper portion of said shell by convection currents and to dissipate said heat in the region of lower temperature and the upper end of said shell having a greater cross sectional area than the lower portion thereof to provide increased radiation area for the upper surface of said filling.

7. An electrode construction for glass furnaces and the like including an electrically conductive shell closed at the bottom and open at the top, means for supporting said shell with the closed lower portion thereof in contact with molten material in the furnace and the open upper portion in a region of lower temperature, a filling in said shell of a material having a melting point below the normal operating temperature of the furnace and adapted to conduct heat from the lower to the upper portion of said shell by convection currents and to dissipate said heat in the region of lower temperature and the upper end of said shell having a greater cross sectional area than the lower portion thereof to provide increased radiation area for the upper surface of said filling, and a central tubular member in said shell adapted to confine the upwardly moving portions of said convection currents to the central portion of said shell.

JOHN FERGUSON.